PULSE GENERATOR

Filed Nov. 23, 1956 2 Sheets-Sheet 1

Inventors
ROBERT W. HUGHES
ROBERT L. PLOUFFE, JR.
By Alfred C. Hill
Agent

Inventors
ROBERT W. HUGHES
ROBERT L. PLOUFFE, JR.
By Alfred C. Hill
Agent

United States Patent Office 2,829,346

Patented Apr. 1, 1958

2,829,346

PULSE GENERATOR

Robert W. Hughes, Mountain Lakes, and Robert L. Plouffe, Jr., Livingston, N. J., assignors to International Telephone and Telegraph Corporation, Nutley, N. J., a corporation of Maryland Application November 23, 1956, Serial No. 623,902

10 Claims. (Cl. 332—9)

This invention relates to pulse generators and more particularly to a generator for producing pulses from a sine wave source such that the time position of the generated pulse may be varied.

In certain communication systems, the intelligence signal is transmitted between selected points by means of pulses having the time position thereof varied in accordance with the intelligence. When such pulse modulations are multiplexed, it is necessary to generate gate pulses properly timed with respect to a synchronizing signal to separate the multiplexed pulse signals for demodulation thereof.

An object of this invention is to provide a circuit for generating pulses from a sine wave source enabling the varying of the time position of the generated pulse without the use of discharge devices or transistors.

Another object of this invention is to provide a passive pulse time modulator for generating from a sine wave source, time modulated pulses.

Still another object of this invention is to provide a gate pulse generator wherein the time position of the gate pulses may be adjusted with respect to the received synchronizing signal.

A feature of this invention is the provision of a pulse generator including a delay line having a relatively long length as compared with the delay from the input to the output taps. A sine wave source is coupled to the sending end of the long delay line and a resistive termination is coupled to the receiving end of the delay line. Variation of the resistive termination by a modulating signal or a phase control signal will produce a phase shift in the sine wave voltage along certain portions of said delay line adjacent the sending end thereof. A translating circuit is coupled to said certain portion of said delay line to produce a pulse from the zero axis crossover of said sine wave. The shift in phase experienced by the zero axis crossover of said sine wave will result in a time shifted pulse whose position is proportional to the variation of said resistive termination.

Figure 1A:
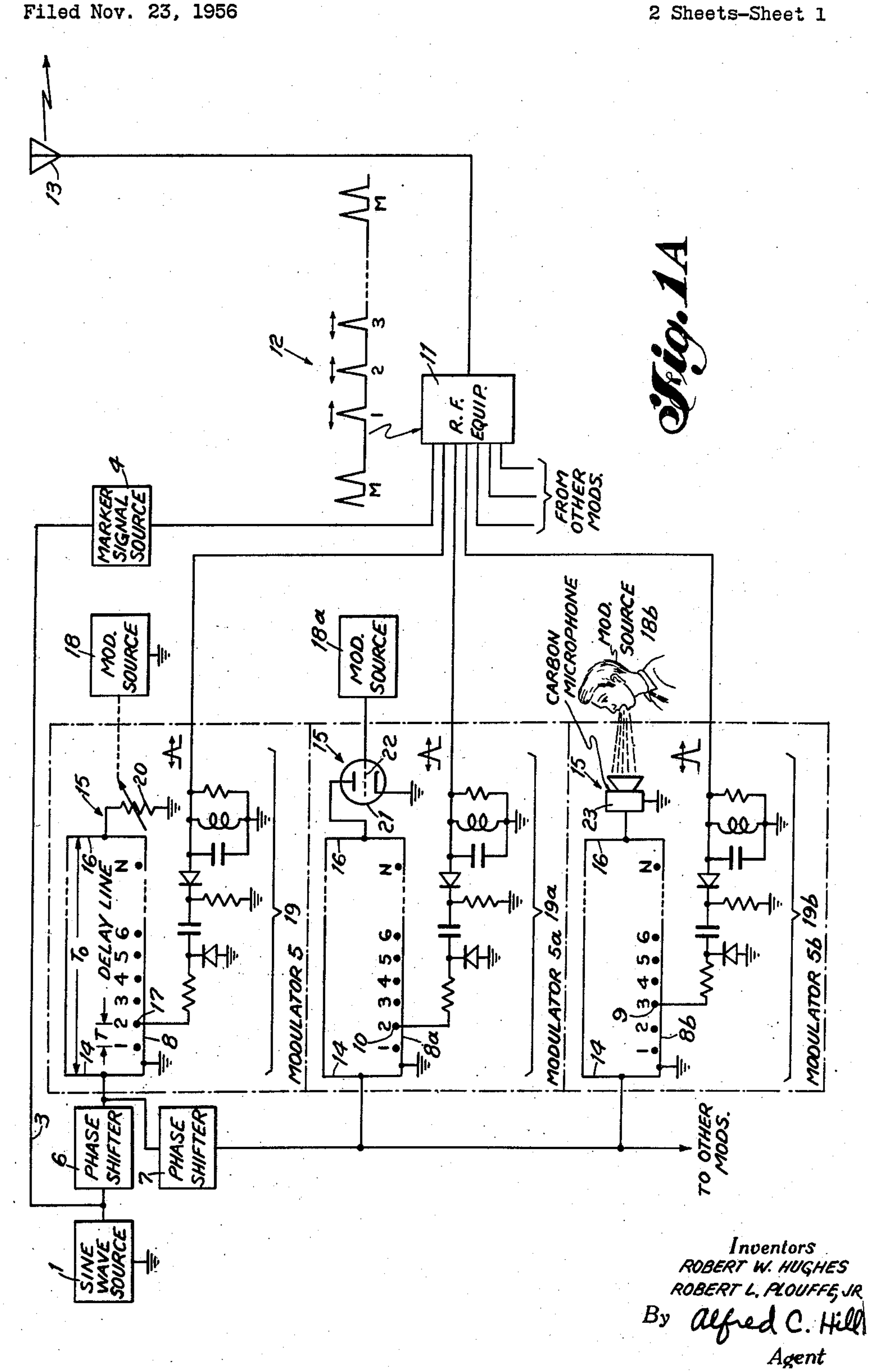
Figures 1B, 2:
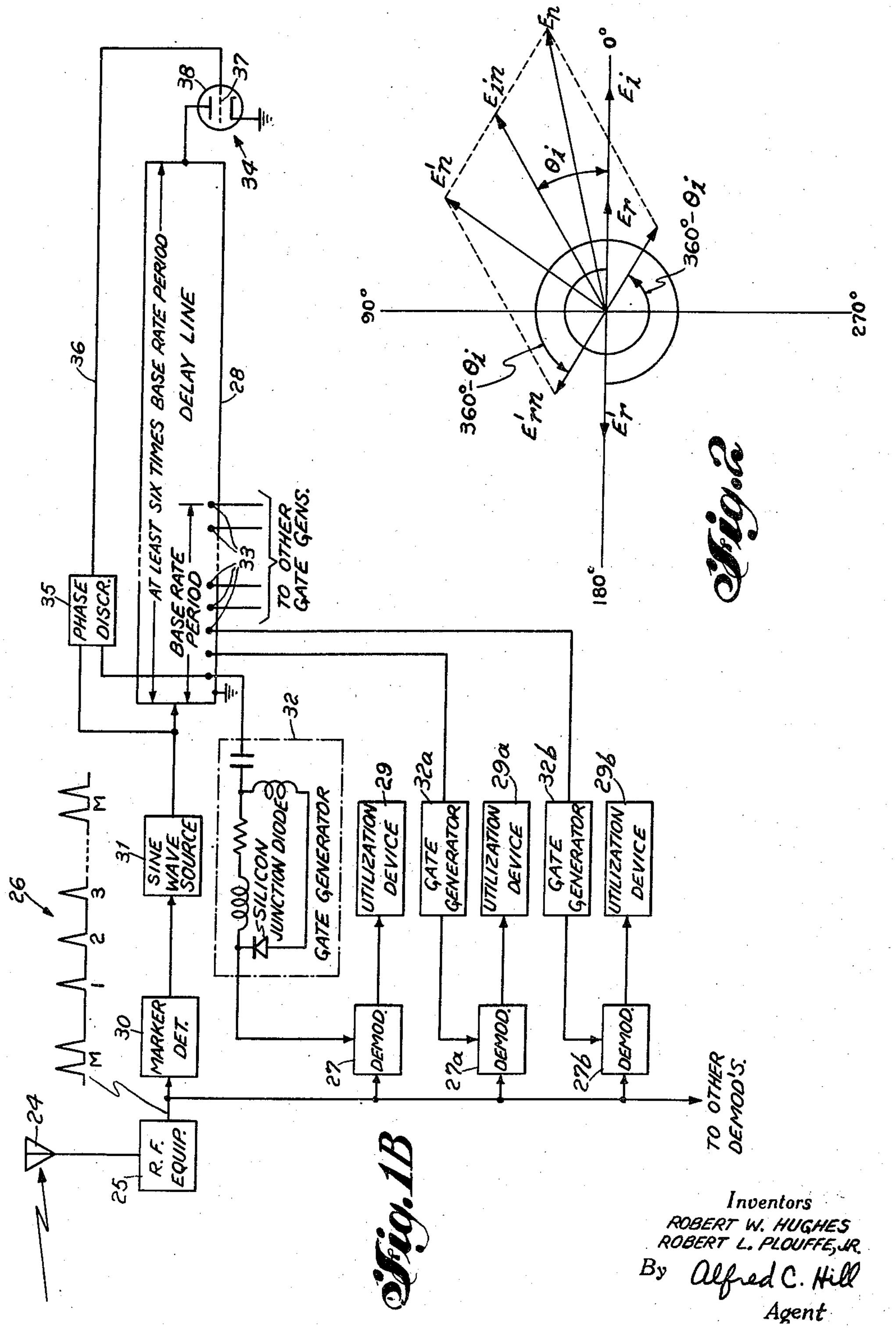

The above-mentioned and other features and objects of this invention will become more apparent by reference to the following description taken in conjunction with the accompanying drawings, in which:

Figs. 1A and 1B schematically illustrate a multiplex communication system employing pulse generators in accordance with the principles of this invention; and Fig. 2 is a vector diagram useful in explaining the operation of the pulse generator of this invention.

Referring to Fig. 1A, there is illustrated the multiplexer portion of a multiplex communication system including a sine wave source 1 repetitious at the basic or sampling period of the system. The output of source 1 is coupled over two paths. The first path is over conductor 3 to a marker signal source 4 which produces from the sine wave a synchronizing signal for transmission to the receiver or demultiplexer portion of the system such as illustrated in Fig. 1B. This marker signal may consist of a double pulse or a signal having other distinguishing characteristics with respect to the pulses of the communication channel. At the demultiplexer this signal is utilized to properly separate the communication channels for demodulation of these channel signals in the appropriate demodulator circuits.

The marker pulse depicted in the system of Fig. 1 is of the double pulse type, although other types of marker pulses may be employed provided they can be generated from a sine wave. To accomplish the double pulse marker generation from a sine wave, a marker generator circuit as disclosed in the copending application of R. L. Plouffe, Jr., filed June 6, 1955, Serial No. 513,468, entitled "Pulse Communication System" may be used. This circuit consists of two parallel paths including diodes which may be of the semiconductor type responsive to the zero axis crossover of the sine wave to produce pulses with a phase shifting element included to shift the phase of the output of one path relative to the other.

The second path for the signal from source 1 is to the plurality of modulators 5. The position of the outputs of modulators 5 may be controlled to form a time interleaved pulse train by phase shifters 6 and 7. The time position of the modulated pulses may also be accomplished by the relative position of the output taps along delay lines 8, forming a portion of the modulators, substantially as depicted in modulator *5b* where the output tap 9 is in a different time position than the output tap 10 of delay line *8a*. The channel signal outputs of modulators 5 are coupled to common R. F. equipment 11 where the pulse train is formed as illustrated in curve 12 for subsequent transmission from antenna 13.

The modulators 5 of this system are illustrated as comprising delay lines 8 coupled at the sending end 14 to the sine wave source 1 and a resistive termination 15 coupled at the receiving end 16. The resultant sine wave output of delay lines 8 is removed from output taps 9, 10, 17 disposed adjacent the sending end 14. To accomplish the objects of this invention and to provide linear modulation, the length of delay lines 8 must be relatively long, in the order of 6 times longer than the delay between the sending end and the output taps 9, 10 and 17.

Modulation is accomplished by varying the resistance of resistive termination 15 in accordance with the signal of modulating source 18. The change in terminating resistance of the delay lines 8 will vary the reflection coefficient and hence the resultant phase of the sine wave at output taps 9, 10, and 17. The output of delay lines 8 will then be a sine wave whose phase, due to the adding of the incident and reflected sine wave at the output point, is varying in accordance with the modulating signal. The sine wave is then operated on by circuit 19 to generate from the zero crossover point a pulse whose time position is varying proportionally with the phase variation of the sine wave output. For the reason that the pulse is generated at the zero crossover point, change in amplitude accompanying the change in phase is not objectionable. Details of the circuit 19 may be found in the above identified copending application to Plouffe.

The shift in phase of the sine wave along the delay line 8 in the vicinity of the sending end 14 may be expressed mathematically as illustrated below.

$e_s = E_s \sin \omega t$ the input signal to the delay line $e_s = E_s \sin \frac{2\pi k t}{T_0}$ where $k = \frac{\omega T_0}{2\pi}$ and $T_0 = NT$ from delay line 8

Reflection coefficient $= \frac{R - R_0}{R + R_0}$ where R is equal to the terminating resistance and $R_0$ is equal to the characteristic impedance of delay line 8

$$\text{Incident wave} = e_i = E_s\epsilon^{-j\frac{2\pi knT}{T_0}}$$

$$\text{Reflected wave} = e_r = \left[\frac{R-R_0}{R+R_0}\right]E_s\epsilon^{-j\frac{2\pi k(N-n)T}{T_0}}$$

Therefore, the voltage at each point along the delay line is:

$$e_n = e_i + e_r = E_s\left[\epsilon^{-j\frac{2\pi knT}{T_0}} + \frac{R-RR_0}{RR_0}\epsilon^{-j2\pi k}\times\epsilon^{j\frac{2\pi knT}{T_0}}\right]$$

$$= \frac{E_s}{R+R_0}\left[(R+R_0)\epsilon^{-j\frac{2\pi knT}{T_0}} + (R-R_0)\epsilon^{-j2\pi k}\epsilon^{j\frac{2knT}{T_0}}\right]$$

For simplicity of the present analysis, let $k$ be any integer. Then $$\epsilon^{-j2\pi k} = 1.$$

$$e_n = \frac{2E_s}{R+R_0}\left[R\frac{(\epsilon^{j\omega nT}+\epsilon^{-j\omega nT})}{2} - jR_0\frac{(\epsilon^{j\omega nT}-\epsilon^{-j\omega nT})}{2j}\right]$$

$$= \frac{2E_s}{RR_0}[R\cos\omega nT - jR_0\sin\omega nT]$$

$$= \frac{2E_s}{1+\frac{R_0}{R}}\sqrt{\cos^2\omega nT + \left(\frac{R_0}{R}\right)^2\sin\omega nT}\ \angle -\tan^{-1}\frac{R_0}{R}\tan\omega nT$$

$$\theta_n = -\tan^{-1}\frac{R_0}{R}\tan\omega nT \approx \frac{K_n}{R}\ \text{for small angles.}$$

Thus, for small angles, $\tan\omega nT \leq 1$, the phase $\theta$ at points along the delay line are proportional to the terminating resistance. The phase variation will be linear with respect to terminating resistance variation if the delay line is long with respect to the delay between the sending end and the point at which it is desired to tap the delay line for an output signal.

Fig. 2 illustrates in vector diagram form the addition of incident and reflected waves for two conditions of the terminating resistance. This shows pictorially the modulation or phase shift possible with the circuit of this invention. In Fig. 2 it is assumed that a voltage will be delayed 360° or an integral multiple thereof between sending and receiving end. The vector $E_i$ illustrates the incident voltage at the sending end of the line. Vector $E_{in}$ illustrates the incident voltage at a given point along the delay line. Vector $E_r$ represents the reflected voltage at the receiving end of the line when the terminating resistance is larger than the characteristic impedance, a positive reflection coefficient. Vector $E_r$ is effectively rotated counterclockwise $360-\theta_1$, where $\theta_1$ is the phase of the incident wave at the given point, to determine the phase of the reflected voltage $E_{rn}$, at the given point. Using parallelograms, it is possible to determine the phase of the combined waves, $E_n$, resulting from the addition of $E_{rn}$ and $E_{in}$.

In Fig. 2, the vector $E_r'$ illustrates the reflected voltage at the receiving end of the line when the terminating resistance is smaller than the characteristic impedance, a negative reflection coefficient. Vector $E_r'$ is effectively rotated $360-\theta_1$ to determine the phase of the reflected voltage, $E_{rn}'$, at the given point. Again $E_n'$ is the summation of $E_{in}$ and $E_{rn}'$. Thus, variation of the resistive termination produces a proportional variation in phase of the resultant sine wave output which when translated to a pulse signal results in pulse time modulation signals.

Various resistive terminations 15 are illustrated in Fig. 1A. Termination 15 may be a potentiometer 20 which is mechanically or otherwise varied by source 18. On the other hand, termination 15 may be an amplifying device such as triode 21 or a transistor whose resistance is varied by the signal of source 18a coupled to the grid 22. Still another termination 15 may be a carbon microphone 23. Each of these resistive terminations will result in a proportional phase variation of the combined output signal when the resistance value theory is varied.

Referring to Fig. 1B, the demultiplexer portion of the communication system is illustrated. The R. F. signal transmitted from antenna 13 is received on antenna 24 and coupled to R. F. equipment 25 where the received signal is operated on to produce a pulse train as depicted in curve 26. The pulse train is distributed to demodulators 27 wherein the appropriate channel signal is separated from the pulse train by the properly timed gate pulse from delay line 28. The separated channel pulse is then coupled to device 29 for utilization.

The pulse train is also coupled to marker detector 30 wherein known circuits extract the marker pulse from the pulse train and produces a synchronizing pulse repetitious at the sampling rate of the system. This pulse then activates a sine wave generator or source 31 to produce sine waves having a frequency equal to the sampling frequency of the system. This sine wave is then coupled to delay line 28 for timed distribution to the gate generators 32 which produce from the crossover point of the sine wave a gate pulse for the separating operation in the demodulator 27. Details of the circuit of generators 32 will be found in the copending application of R. W. Hughes, R. L. Plouffe, Jr. and H. T. Peretko, filed May 17, 1956, Serial No. 585,529, entitled "Pulse Generator."

The delay line 28 is of the type described in connection with modulators 5 of Fig. 1A and is in this instance employed to correct the positions of the gate pulses applied to the demodulators 27. It will be observed that delay line 28 has a length relatively long with respect to the base rate or sampling period of the system and that the channel gate taps 33 are disposed adjacent the sending end of delay line 28. Thus, any resistive variation of the resistive termination 34 produces a linear change in phase of the sine waves at the various taps 33.

To achieve the gate position correction, the output of one of taps 33 is coupled to a phase discriminator 35 for comparison with the phase of the input to delay line 28. Any detected phase difference results in a plus or minus control voltage on conductor 36 which is coupled to grid 37 of tube 38. This will correct the phase of the sine wave at the taps 33 to correspond with the phase of the input sine wave signal and thus correctly position the gate pulse produced in generators 29 for their separating action.

While we have described above the principles of our invention in connection with specific apparatus, it is to be clearly understood that this description is made only by way of example and not as a limitation to the scope of our invention as set forth in the objects thereof and in the accompanying claims.

We claim:

1. A pulse signal generator comprising a delay line, a source of sine wave voltage coupled to the sending end of said delay line, a resistive termination coupled to the receiving end of said delay line, means to vary said resistive termination to vary the phase of the sine wave voltage present along a certain portion of said delay line, and means coupled to said certain portion of said delay line to produce a pulse from the zero axis crossover of said phase-varied sine wave.

2. A generator according to claim 1, wherein said certain portion is disposed adjacent the sending end of said delay line and said delay line has a length relatively long in comparison to the length of said certain portion.

3. A generator according to claim 1, wherein said resistive termination includes a microphone and said means to vary includes sound waves of audio intelligence.

4. A generator according to claim 1, wherein said resistive termination includes a triode type device and said means to vary includes a modulating signal coupled to the control electrode of said triode device.

5. A pulse time modulator comprising a delay line, an output tap disposed along said delay line a given distance from the sending end of said delay line, a source of sine wave voltage coupled to the sending end of said delay line, a resistive termination coupled to receiving end of said delay line, an intelligence source coupled to said resistive termination to vary the phase of the sine wave output at said output tap proportional to the intelligence of said intelligence source, and means coupled to said output tap to produce a pulse from the zero crossover of said output sine wave time modulated in accordance with said phase variation.

6. A modulator according to claim 5, wherein said delay line has a relatively long time delay between the sending end and receiving end thereof in comparison with the time delay between the sending end and said output tap.

7. A gate pulse generator comprising a delay line, an output tap disposed along said delay line a given distance from the sending end of said delay line, a source of sine wave voltage repetitious at a given rate coupled to the sending end of said delay line, a resistive termination coupled to receiving end of said delay line, a phase discriminator coupled to the output of said sine wave source and said output tap to produce a control voltage indicative of the phase difference between the output of said sine wave source and the sine wave output of said output tap, means coupling said control voltage to said resistive termination to adjust the phase of the sine wave output of said output tap in accordance with said phase difference and means coupled to said output tap to generate a correctly timed gate pulse from the zero crossover of said sine wave.

8. A generator according to claim 7, wherein said delay line has a relatively long time delay between the sending end and receiving end thereof in comparison with the delay between the sending end and said output tap.

9. A gate pulse generator and distributor comprising a delay line, a source of sine wave voltage having a given repetition frequency coupled to the sending end of said delay line, a plurality of output taps spaced along said delay line from the sending end of said delay line to a given point therealong equal to the period of said given repetition frequency, a resistive termination coupled to the receiving end of said delay line, a phase discriminator coupled to the output of said sine wave source and one of said output taps to produce a control voltage indicative of the phase difference between the output of said sine wave source and the outputs of said output taps, means coupling said control voltage to said resistive termination to adjust the phase of the outputs of said output taps in accordance with said phase difference and means coupled to each of said output taps to generate correctly timed gate pulses from the zero crossover of said output sine wave.

10. A generator and distributor according to claim 9, wherein said delay line has a relatively long time delay between the sending end and receiving end thereof in comparison with the period of said repetition frequency.

No references cited.